United States Patent [19]

Seely, Jr. et al.

[11] Patent Number: 4,879,122
[45] Date of Patent: Nov. 7, 1989

[54] CRUNCHY FRUIT BRITTLE PRODUCT AND PROCESS

[75] Inventors: William B. Seely, Jr., Dallas; Charmaine C. Jackson, Coppell, both of Tex.

[73] Assignee: Frito-Lay, Inc., Dallas, Tex.

[21] Appl. No.: 143,237

[22] Filed: Jan. 7, 1988

Related U.S. Application Data

[63] Continuation of Ser. No. 880,056, Jun. 30, 1986, abandoned.

[51] Int. Cl.$^4$ .............................................. A23L 1/072
[52] U.S. Cl. .................................... 426/102; 426/639
[58] Field of Search ............... 426/615, 620, 621, 618, 426/619, 290, 629, 443, 455, 457, 458, 506, 509, 803, 639, 102

[56] References Cited

U.S. PATENT DOCUMENTS

| | | | |
|---|---|---|---|
| 2,272,990 | 2/1942 | Forkner et al. | 426/617 |
| 3,843,810 | 10/1974 | Fehmerling | 426/639 |
| 4,117,176 | 9/1978 | Taylor et al. | 426/660 |
| 4,355,050 | 10/1982 | Butland | 426/615 |
| 4,417,405 | 11/1983 | Fuller | 426/640 |
| 4,514,429 | 4/1985 | Glass et al. | |
| 4,547,376 | 10/1985 | Silver et al. | |
| 4,654,222 | 3/1987 | Fuller | 426/640 |
| 4,673,578 | 6/1987 | Becker | 426/618 |
| 4,681,770 | 7/1987 | Palmer | 426/615 |

Primary Examiner—Donald E. Czaja
Assistant Examiner—Carolyn Paden
Attorney, Agent, or Firm—Bernard, Rothwell & Brown

[57] ABSTRACT

A crunchy fruit brittle is produced by chopping apples or pieces thereof into particles having a critical size distribution; admixing the apple particles with a binder/texturizer composition containing a crystallizable sugar; sheeting the mixture; and drying the mixture to a moisture content from about 0% to 3.0%.

26 Claims, 1 Drawing Sheet

CRUNCHY FRUIT BRITTLE PRODUCT AND PROCESS

This is a continuation of application Ser. No. 880,056 filed June 30, 1986 abandoned.

BACKGROUND OF THE INVENTION

This invention relates to a crunchy fruit brittle product and a method of making such a product.

The healthful qualities of fruit have been widely recognized for many years. Numerous efforts have been made in the snack food industry to incorporate fruits into snack foods. Thus, for example, U.S. Pat. No. 1,686,785 describes the preparation of a fruit-based product in which a dried pulpous fruit is cut into small pieces or flakes and the fruit is then mixed thoroughly with a binding material such as syrup. The mixture is poured into presses which are used to express the liquid portion from the mixture. A sufficient pressure is applied to the mixture such that the liquid is completely expressed therefrom and the mixed, sweetened fruit which remains is compactly pressed into a solid mass. The mass can then be cut into cubes or rolled into thin sheets which are cut into strips or short sticks.

U.S. Pat. No. 3,006,773 describes a fruit product which is prepared from fruit pulp which is reduced by comminution to a uniform, finely divided condition thereby forming a mass having a consistency suitable for molding into the form of chunks, sticks, bars, and the like suitable for wrapping in a manner similar to chewing gum or candy bars. The comminuted, uncooked fruit is homogenized with added sugar while maintaining the temperature below the freezing point of water.

U.S. Pat. No. 3,554,766 describes the preparation of fruit-flavored hard candy comprising a hard candy matrix containing particles of freeze-dried fruit, the particles being partially reconstituted and having a preserving and protecting layer of sugar and corn syrup. The freeze-dried fruit is maintained under conditions in which the candy matrix does not penetrate the fruit.

U.S. Pat. No. 3,384,496 describes an apple product which is produced by heating apple slices having a biologically normal moisture content to render the slices pliant and reduce the moisture content thereof, convoluting the slices to form three-dimensional configurations wherein at least a part of the perimeter and adjacent area of one side of the slices are bent proximate to one another and rapidly cooling said convoluted slices to impart a brittle nature thereto The slices can be treated prior to heating with acids, such as citric acid, to provide tartness and with flavorings, including sugar, cinnamon and the like.

U.S. Pat. No. 3,134,683 describes a process for producing a fruit product particularly suited for incorporation into a breakfast cereal The process involves preparing a thoroughly mixed, extrudable composition comprising fruit, fat, sugar and starch, extruding the composition, partially drying the extrudate, heating the dried extrudate and flattening the heated dried extrudate. The flattened extrudate is then reduced to flakes.

U.S. Pat. No. 4,547,376 describes a process for producing crisp and dry fruit or vegetable slices. Whole fruit or vegetable pieces are sliced into thin, wafer-like slices which are then monolayered. An aqueous film containing a carbohydrate, an anti-browning agent and an acid is applied to at least one surface and the acidity of the slices is adjusted to alter their tartness. The slices are then rapidly dried to produce crisp slices.

Prior art processes which involve comminution of fruit meats such as apple meat into fine particles generally do not result in the maintenance of crunchy apple texture. Many of these products, characterized as "fruit leathers," have a very chewy texture. While some consumers find such products pleasing, still others would prefer to have a product in which the crunchy texture of the natural fruit is maintained.

Prior art fruit products which employ treated slices of fruit, e.g., apple slices, tend to produce a crisp (as distinguished from crunchy) product. However, handling of individual slices, which must be monolayered on a conveyor belt for treatment, is difficult. Moreover, processing the apples into slices involves the generation of a relatively large amount of pieces of unacceptable size to be used in the product.

It is an object of this invention to provide a method for preparing snack foods from pulpous fruits, such as apples, in which the product retains a crunchy texture similar to that of the whole fruit.

It is a further object of the invention to provide a method for preparing a crunchy snack food from pulpous fruits, such as apples, which does not involve the difficulties in material handling encountered in the preparation of sliced fruit-based products and which minimizes or eliminates unusable scrap in the production of the product.

SUMMARY OF THE INVENTION

This invention provides a method for preparing a fruit brittle product containing apple pieces which retains the crunchy texture characteristic of unprocessed apple meat. In accordance with the teachings of the invention, a crunchy fruit brittle is prepared by the method which comprises:

(a) chopping apples or pieces thereof into particles, at least 35% of which have a particle size from about 0.03 inches to about 0.14 inches;

(b) admixing the apple particles with a binder/texturizer composition containing a crystallizable sugar such as sucrose or a mixture of sucrose and crystalline fructose; the weight ratio of apple particles to binder/texturizer composition being from about 20:1 to about 7:1;

(c) sheeting the mixture to a thickness from about 0.04 inches to about 0.16 inches; and (d) drying the sheeted mixture to a moisture content from about 0% to about 3.0%, provided that at least about 40% of the apple cells are maintained intact.

In an alternative embodiment of the method of the invention, the chopped apple particles are mixed with the binder/texturizer and dried to a moisture content from about 20% to about 60% prior to sheeting. After sheeting, drying is continued until the moisture content is from about 0% to about 3.0%.

DETAILED DESCRIPTION OF THE INVENTION

Figure 1:
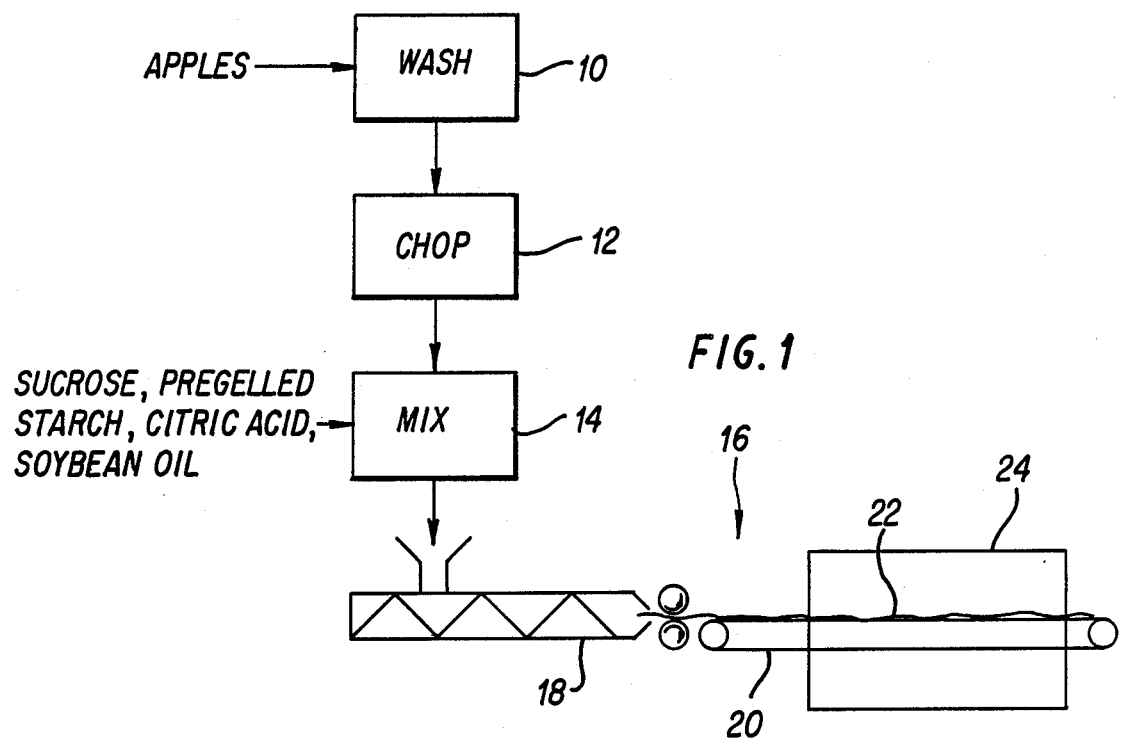
FIG. 1 is a schematic illustration of the method of the invention for producing a crunchy apple brittle.

The fruit brittle product of the invention incorporates apple as the primary pulpous fruit. Other fruits can optionally be incorporated as described below. No special preparation of the apples other than normal cleaning is required prior to subjecting them to the method of the invention to produce the crunchy fruit brittle. If desired, one can peel the apples and remove the cores, stems and seeds; however, we have found that a satisfactory product can be obtained using the entire apple. Incorporation of apple parts, such as peels and stems, primarily affects the appearance of the product and is largely a matter of consumer preference. Apple pieces, which may be obtained as scrap from other apple processing operations, can be employed as starting material, provided the apple particles produced therefrom are within the particle size range set forth below In accordance with the method of the invention, apples or pieces thereof are chopped into particles. An essential feature of the method of the invention is the maintenance of conditions which assure that at least about 40% of the cells of the apple meat remain intact throughout the chopping and other processing steps. While not wishing to be bound by a particular theory, it is believed that the crystallizable sugar in the binder/texturizer penetrates the cell walls of the intact cells and rigidifies the cells to impart the crunchy texture characteristic of the product. In addition, the crystallizable sugar forms a lattice structure with pectin and other constituents to provide a crunchy matrix. If too few cells remain intact, the product may not be crunchy, but rather soft and chewy like the "fruit leathers" of the prior art.

In order to assure that the required percentage of cells remains intact, it is important that the particle size distribution of the chopped apples be such that at least about 35% of the particles have a particle size from about 0.03 inches to 0.14 inches. While there is no strict upper limit on the size of the remaining particles, it is preferred that they not exceed about 0.16 inches. Particle sizes which are excessively large will have an adverse effect on drying time. By observing this particle size distribution, it is assured that an excessive number of cell walls will not be broken during the chopping process. An added advantage of maintaining at least about 40% of the cells intact is that the chemicals which produce the natural flavor notes of the apple are not lost through cell breakage.

The desired particle size distribution can be obtained using conventional chopping procedures and commercially available chopping equipment. On a commercial scale, a bowl chopper of the type conventionally used to chop meat, for example, in sausage production, is suitable Additionally, a conventional food processor set on "chop" will usually provide the desired particle size distribution.

The binder/texturizer which is employed in the method of the invention includes a crystallizable sugar "Crystallizable sugar" as used herein includes sugars which can exist in the crystalline form, even though they may require a more specialized treatment than that required to form crystalline sucrose from a solution Preferred crystallizable sugars are sucrose and dextrose. Additionally, crystallizable forms of fructose can be employed. Crystalline fructose is currently not available in commercial quantities, but is available in experimental quantities and should be commercially available in the future. This material is currently called "dry crystalline fructose" by A.E. Staley Co., Decatur, Ill.

Advantageously, the binder/texturizer also contains a food-grade acid in an amount sufficient to adjust the tartness of the final product to a level which imparts a taste similar to the natural fruit. Suitable acids include citric, malic, tartaric, ascorbic and formic acids. The amount of acid can vary depending on individual taste and the degree of tartness of the apples. Generally, the binder/texturizer solution can contain up to about 4% of a food-grade acid. The binder/texturizer composition contains from about 0% to about 3.0% by weight citric acid.

Preferably, the binder/texturizer also contains an edible moisture-absorbing substance. Suitable moisture-absorbing substances include, for example, pregelled starch, flour, apple fiber and pectin. A preferred moisture-adsorbing substance is pregelled starch, particularly pregelled starch that is capable of swelling in water at room temperature. Such "cold-swell" starches are commercially available, for example, from A.E. Staley Co., Decatur, Ill. Pectin is naturally present in apples and is released in the juice of the apple upon chopping. Providing additional pectin, as part of the binder-texturizer composition, tends to improve the sheetability of the mixture of apple particles and binder/texturizer. The pectin, if present in the binder/texturizer, preferably comprises from 1% to 10% by weight thereof.

Preferably, the binder/texturizer composition also contains a softening or tenderizing agent. The softening or tenderizing agent is an edible substance which reduces hardness or brittleness in the finished product without adversely affecting the natural crunchy texture of the apple particles. Preferred softening agents are fats and oils, which may be saturated fats or unsaturated or hydrogenated oils. Particularly preferred are partially hydrogenated oils which have melting points above room temperature. Suitable oils include unsaturated or partially hydrogenated soybean, peanut, cottonseed, sunflower, safflower, corn oil and the like. Corn syrup, e.g., high fructose corn syrup, in amounts up to about 30% by weight of the binder/texturizer can also be used as a softening agent.

In its broadest embodiment, the method of the invention employs a binder/texturizer comprising from 5% to 100% crystallizable sugar, from 0% to 55% moisture-adsorbing substance and from 0 to 40% softening agent, based on the weight of the binder/texturizer. In a preferred embodiment the binder/texturizer comprises from 15% to 90% crystallizable sugar, from 5% to 45% moisture adsorbing substance and from 5% to 40% softening agent, based on the weight of the binder/texturizer. In the most preferred embodiment, the binder/texturizer comprises from 30% to 60% crystallizable sugar, from 20% to 35% moisture-adsorbing substance and from 20% to 35% softening agent.

Figure 2:
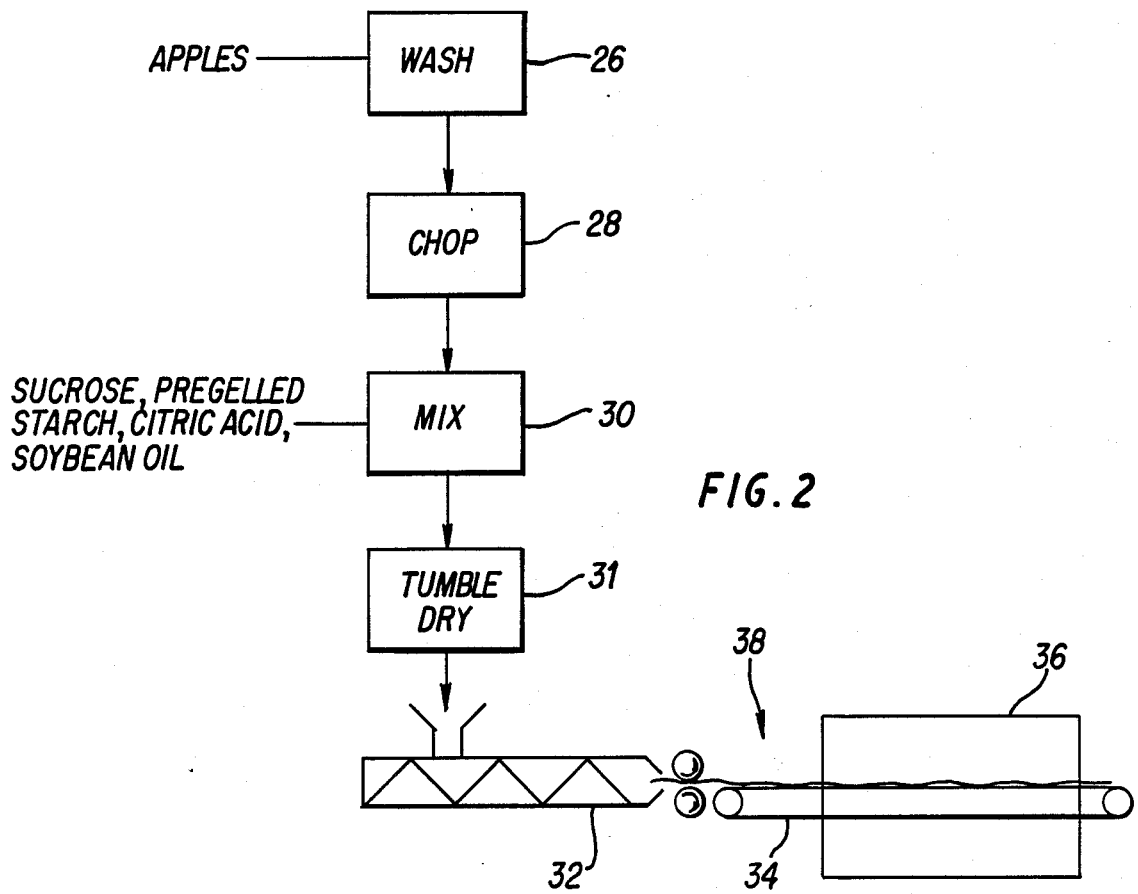
FIG. 2 is a schematic illustration of an alternative embodiment of the invention in which the apple particles and binder/texturizer are partially dried prior to sheeting.

The method of the invention can be understood with reference to the schematic illustrations in FIG. 1 and FIG. 2. As illustrated in FIG. 1, the apples are washed in step 10 and chopped into particles in step 12. The juice of the apples, which is released in chopping and which contains water, pectin and flavor ingredients, is retained with the apple particles and acts to dissolve the binder/texturizer ingredients to create a binder matrix. The particles are admixed with the binder/texturizer in step 14 prior to sheeting in step 16. The weight ratio of apple particles to binder/texturizer is from about 20:1 to about 7:1. Any conventional mixing method which assures thorough mixing can be employed, provided it does not result in the breakage of too many of the apple cells. If desired, the individual components of the binder/texturizer can be individually added to the apple particles and all the components mixed together. Alternatively, the individual components of the binder/texturizer can be premixed prior to adding them to the apple particles.

The mixed apple particles and binder/texturizer are then sheeted to a thickness of from about 0.03 inches to about 0.16 inches. Sheeting can be effected by any conventional means which does not result in apple particles being crushed or apple cells being otherwise broken. Preferably, sheeting is effected using a roller extruder (indicated schematically by 18) of the type conventionally employed to extrude granola bars without crushing the cereal components. Suitable roller extruders can be obtained commercially and include, for example, a Bepex-HUTT with Model GP head. Alternatively, a positive displacement pump can be used to force the material through a sheeting die or the material can be allowed to flow by gravity through a constant head box in a manner similar to that used in paper processing operations.

If desired, the mixture of apple particles and binder/texturizer can be sheeted and dried in batches. It is preferred, however, to deposit the sheeted mixture from a roller extruder 18 onto an endless belt conveyor 20 which transports the sheeted mixture as a continuous sheet 22 through a drying oven, preferably of the convection type indicated schematically by 24. The sheeted mixture is dried to a final moisture content from about 0% to about 3.0%. The temperature and drying time in the oven will necessarily vary depending, inter alia, on the moisture content of the apples, thickness of the sheet and water content of the binder/texturizer solution. Generally, a drying time from about 45 min. to 150 min. at a temperature from about 220° F. to 350° F. will suffice.

In another embodiment of the method of the invention, illustrated schematically in FIG. 2, the apple particles are partially dried prior to sheeting. The apples are washed in step 26 and chopped in step 28 to the previously described particle size distribution. The chopped apples and associated juices are mixed with sucrose, pregelled starch, soybean oil and citric acid in step 30. The mixture is then partially dried, preferably in a tumble dryer, in step 31. The apple mixture is preferably dried in step 31 to a moisture content from about 20% to 60%. The mixture is then charged to a roller extruder 32 from which it is sheeted onto an endless belt conveyor 34 to form a sheet 38 having a thickness from about 0.03 inches to 0.16 inches. By partially drying the mixture in a tumble dryer prior to sheeting, the length of the drying oven 36 can be reduced considerably, resulting in a substantial cost savings.

After the dried sheet has emerged from the drying oven 24 or 36, it is broken or cut into pieces of desired size, which can be regularly or irregularly shaped.

The method and product of the invention offer several advantages over apple chips produced from apple slices. The method of the invention does not require monolayering of slices on the conveyor belt, which is difficult and results in less than full utilization of belt space. By contrast, the method of the invention allows virtually 100% utilization of conveyor belt space. Furthermore, the method of the invention allows the easy incorporation of materials other than apple particles. With apple chips produced from apple slices, only materials capable of adhering to the surface of the slice through the processing steps can be incorporated into the product. The product of the invention can incorporate up to about 50%, by total product weight, of materials in addition to the apple particles.

Other pulpous fruits such as oranges, peaches, melons, blueberries, strawberries, pineapples, and the like can be incorporated in comminuted form. These fruits generally do not have the rigid cell structure of apples, however, and they may impart a chewy texture to the product at levels of 50% or more. Preferably, not more than about 40% of the product constitutes fruit other than apples. The other fruits, if present, are preferably chopped to a size distribution similar to that of the apple particles. They can be admixed with the apple particles at step 14 or step 18 as shown in FIG. 1 or at step 30 or step 32 as shown in FIG. 2.

If it is desired to incorporate fruit particles other than apple and to retain the full crunchy texture associated with the apple particles, the other fruits can be subjected to "explosion puffing" prior to admixing with the apple particles, in order to modify their texture. Explosion puffing is a procedure known to those skilled in the art and is described in Eisenhart et al., *Food Engineering*, June 1964, pp. 53–55. Alternatively, the sheeted product on the conveyor 20 or 34 can be subjected to vacuum drying in order to impart the cell structure necessary to obtain crunchy texture in the other fruit particles. Vacuum drying equipment is known and commercially available.

If desired, the crunchy fruit brittle of the invention can also incorporate crisped cereals such as crisped rice or wheat. Preferably, the amount of crisped cereal does not exceed about 60% of the total weight of the product.

If desired, anti-browning agents such as sodium bisulfite can be incorporated into the product of the invention in the usual effective amounts, e.g., from about 200 ppm to about 400 ppm. Apple meat is known to be subject to browning. However, the use of bisulfites is optional and is not particularly needed when the apple particles are used in unpeeled form, inasmuch as the peel imparts its own characteristic color to the product.

The following examples are intended to further illustrate the practice of the invention described herein and are not intended to limit the scope in any way.

EXAMPLE I

A crunchy apple brittle was prepared from the following ingredients:

| Ingredient | Amount (grams) |
| --- | --- |
| Chopped Apples | 425 |
| Sucrose | 35 |
| Cracker Flour | 12 |
| Citric Acid | 0.75 |

Apples were washed, cored and quartered. The apples were added to a Cuisinart mixer and pulsed approximately 30 times. The apples were stirred intermittently to mix the product and ensure even particle size distribution. Apple pieces ranged between 0.020 in. and 0.080 in. in diameter.

The dry ingredients were weighed, mixed, and added to the chopped apples and mixed well. The product was spread evenly on an Armalon sheet The sheeted mixture was baked in a Fessman oven in 4 zones until dried (1½ to 2 hours). Final moisture content was ≦1.8%.

EXAMPLE II

A crunchy apple brittle was prepared from the following ingredients:

| Ingredient | Amount (grams) |
| --- | --- |
| Chopped Apples | 425 |
| Sucrose | 35 |
| Cold-swell Starch (Redi-tex*) | 23 |
| Citric Acid | 1 |
| Hydrogenated Soybean Oil (meltpoint 95° F.) | 25 |

*A.E. Staley, Decatur, Il.

Apples were washed, cored and quartered. The apples were added to a Cuisinart mixer and pulsed approximately 30 times. The apples were stirred intermittently to mix the product and ensure even particle size distribution. Apple pieces ranged between 0.020 in. and 0.080 in. in diameter.

The dry ingredients were weighed, blended together in a blender (1 min.) and added to the apples. The ingredients were mixed well to hydrate the starch and allow it to swell (~1 min.). The oil was melted and added to the chopped apple mix. The product was spread evenly on an Armalon sheet. The sheeted mixture was baked in a Fessman oven in 4 zones until dried (1½ to 2 hours). Final moisture was ≦1.8%.

EXAMPLE III

A crunchy apple brittle was prepared from the following ingredients:

| Ingredient | Amount (grams) |
| --- | --- |
| Chopped Apples | 425 |
| Sucrose | 25 |
| Crystalline Fructose | 10 |
| Cold-Swell Starch- (Redi-Tex) | 23 |
| Citric Acid | 1 |
| Hydrogenated Soybean Oil (melting point 95° F.) | 25 |

Apples were washed, cored and quartered. The apples were added to a Cuisinart mixer and pulsed approximately 30 times. The apples were stirred intermittently to mix the product and ensure even particle size distribution. Apple pieces ranged between 0.020 in. and 0.080 in. in diameter.

The dry ingredients were weighed, mixed and added to chopped apples. The ingredients were mixed well to hydrate the starch and allow it to swell (~1 min.). The oil was melted and added to the chopped apple mix. The product was spread evenly on an Armalon sheet. The sheeted mixture was baked in a Fessman oven in 4 zones until dried (1½ to 2 hours). Final moisture was ≦1.8%.

What is claimed is:

1. A method for preparing a crunchy fruit brittle which comprises:
   (a) chopping apples or pieces thereof into particles, at least 35% of which have a particle size from about 0.03 inches to about 0.14 inches;
   (b) admixing the apple particles with a binder/texturizer composition comprising from about 5% to about 100% by weight of a crystallizable sugar; from about 0% to about 55% of a moisture-adsorbing substance; and from about 0% to 40% by weight of a softening or tenderizing agent, the weight ratio of apple particles to binder/texturizer solution being from about 20:1 to about 7:1;
   (c) sheeting the mixture to a thickness from about 0.04 inches to about 0.16 inches; and
   (d) drying the sheeted mixture to a moisture content from about 0% to about 3.0%, provided that at least 40% of the apple cells are maintained intact.

2. A crunchy fruit brittle in the form of a sheeted composite having a thickness from about 0.04 inches to about 0.16 inches and a moisture content from about 0% to about 3%, said composite comprising:
   (a) apple particles, at least 35% of which have a particle size from about 0.03 inches to about 0.14 inches, wherein at least 40% of the apple cells of said particles are intact; and
   (b) a binder/texturizer composition comprising from about 5% to 100% by weight of a crystallizable sugar; from 0% to about 55% by weight of a moisture-absorbing substance; and from 0% to about 40% by weight of a softening or tenderizing agent, the weight ratio of apple particles to binder/texturizer composition being from about 20:1 to about 7:1.

3. A method for preparing a crunchy fruit brittle which comprises:
   (a) chopping apples or pieces thereof into particles, at least 35% of which have a particle size from about 0.03 inches to about 0.14 inches;
   (b) admixing the apple particles with a binder/texturizer composition comprising from about 5% to about 100% by weight of a crystallizable sugar; from about 0% to about 55% of a moisture-absorbing substance; and from about 0% to 40% by weight of a softening or tenderizing agent, the weight ratio of apple particles to binder/texturizer solution being from 20:1 to about 7:1;
   (c) sheeting the mixture to a thickness from about 0.04 inches to about 0.16 inches; and
   (d) drying the sheeted mixture to a moisture content from about 0% to 3.0%, provided that at least 40% of the apple cells are maintained intact, wherein the binder/texturizer composition comprises from 15% to 90% by weight of crystallizable sugar, from 5% to 45% by weight of a moisture-absorbing substance and from 5% to 40% by weight of a softening agent.

4. A method for preparing crunchy fruit brittle which comprises:
   (a) chopping apples or pieces thereof into particles, at least 35% of which have a particle size from about 0.03 inches to about 0.14 inches;
   (b) admixing the apple particles with a binder/texturizer composition comprising from about 5% to about 100% by weight of a crystallizable sugar; from about 0% to about 55% of a moisture-absorbing substance; and from about 0% to 40% by weight of a softening or tenderizing agent, the weight ratio of apple particles to binder/texturizer solution being from 20:1 to about 7:1;

(c) sheeting the mixture to a thickness from about 0.04 inches to about 0.16 inches; and (d) drying the sheeted mixture to a moisture content from about 0% to 3.0%, provided that at least 40% of the apple cells are maintained intact, wherein the binder/texturizer composition comprises from 30% to 60% by weight of crystallizable sugar, from 20% to 35% by weight of a moisture-absorbing substance and from 20% to 35% by weight of a softening agent.

5. A method as claimed in claim 3 or 4, wherein the crystallizable sugar is sucrose.

6. A method as claimed in claim 3 or 4, wherein the crystallizable sugar is sucrose, the moisture-absorbing substance is a cold-swellable pregelled starch and the softening agent is an unsaturated or partially hydrogenated oil.

7. A method as claimed in claim 3 or 4, wherein the moisture-absorbing substance is cracker flour.

8. A method as claimed in claim 3 or 4, wherein pectin is added as a part of the moisture-absorbing substance, the amount of pectin being from about 1% to 10% of the binder/texturizer.

9. A method as claimed in claim 3 or 4 wherein the crystallizable sugar is a mixture of sucrose and crystalline fructose.

10. A method for preparing a crunchy fruit brittle which comprises:

(a) chopping apples or pieces thereof into particles, at least 35% of which have a particle size from about 0.03 inches to about 0.14 inches;

(b) admixing the apple particles with a binder/texturizer composition comprising from about 5% to about 100% by weight of a crystallizable sugar; from about 0% to about 55% of a moisture-absorbing substance; and from about 0% to 40% by weight of a softening or tenderizing agent, the weight ratio of apple particles to binder/texturizer solution being from 20:1 to about 7:1;

(c) sheeting the mixture to a thickness from about 0.04 inches to about 0.16 inches; and (d) drying the sheeted mixture to a moisture content from about 0% to 3.0%, provided that at least 40% of the apple cells are maintained intact, wherein the binder/texturizer further contains up to about 4% of a food grade acid.

11. A method for preparing a crunchy fruit brittle which comprises:

(a) chopping apples or pieces thereof into particles, at least 35% of which have a particle size from about 0.03 inches to about 0.14 inches;

(b) admixing the apple particles with a binder/texturizer composition comprising from about 5% to about 100% by weight of a crystallizable sugar; from about 0% to about 55% of a moisture-absorbing substance; and from about 0% to 40% by weight of a softening or tenderizing agent, the weight ratio of apple particles to binder/texturizer solution being from 20:1 to about 7:1;

(c) sheeting the mixture to a thickness from about 0.04 inches to about 0.16 inches; and (d) drying the sheeted mixture to a moisture content from about 0% to 3.0%, provided that at least 40% of the apple cells are maintained intact, wherein the binder/texturizer further contains up to about 3% citric acid.

12. A method for preparing a crunchy fruit brittle which comprises:

(a) chopping apples or pieces thereof into particles, at least 35% of which have a particle size from about 0.03 inches to about 0.14 inches;

(b) admixing the apple particles with a binder/texturizer composition comprising from about 5% to about 100% by weight of a crystallizable sugar; from about 0% to about 55% of a moisture-absorbing substance; and from about 0% to 40% by weight of a softening or tenderizing agent, the weight ratio of apple particles to binder/texturizer solution being from 20:1 to about 7:1;

(c) sheeting the mixture to a thickness from about 0.04 inches to about 0.16 inches; and (d) drying the sheeted mixture to a moisture content from about 0% to 3.0%, provided that at least 40% of the apple cells are maintained intact, wherein particles of fruit other than apples are admixed with the apple particles prior to sheeting and the sheeted mixture is dried under partial vacuum to maintain the crunchy texture of the other fruit, the other fruit being present in an amount up to about 40% by weight of the crunchy fruit brittle.

13. A crunchy fruit brittle product produced by the method of claim 3 or 4.

14. A crunchy fruit brittle product produced by the method of claim 5.

15. A crunchy fruit brittle product produced by the method of claim 6.

16. A crunchy fruit brittle product produced by the method of claim 7.

17. A crunchy fruit brittle product produced by the method of claim 8.

18. A crunchy fruit brittle product produced by the method of claim 9.

19. A crunchy fruit brittle in the form of a sheeted composite having a thickness from about 0.04 inches to about 0.16 inches and a moisture content from about 0% to about 3%, said composite comprising:

(a) apple particles, at least 35% of which have a particle size from about 0.03 inches to about 0.14 inches, wherein at least 40% of the apple cells of said particles are intact; and (b) a binder/texturizer composition comprising from about 5% to about 100% by weight of a crystallizable sugar; from about 0% to about 55% by weight of a moisture-absorbing substance; and from 0% to about 40% by weight of a softening or tenderizing agent, the weight ratio of apple particles to binder/texturizer solution being from about 20:1 to about 7:1, wherein the binder/texturizer composition comprises from 15% to 90% by weight of crystallizable sugar, from 5% to 45% by weight of a moisture-absorbing substance and from 5% to 40% by weight of a softening agent.

20. A crunchy fruit brittle as claimed in claim 19, wherein the binder/texturizer composition comprises from 30% to 60% by weight of crystallizable sugar, from 20% to 35% by weight of a moisture-absorbing substance and from 20% to 35% by weight of a softening agent.

21. A crunchy fruit brittle in the form of a sheeted composite having a thickness from about 0.04 inches to about 0.16 inches and a moisture content from about 0% to about 3%, said composite comprising:

(a) apple particles, at least 35% of which have a particle size from about 0.03 inches to about 0.14 inches, wherein at least 40% of the apple cells of said particles are intact; and (b) a binder/texturizer composition comprising from about 5% to about 100% by weight of a crystallizable sugar; from about 0% to about 55% by weight of a moisture-absorbing substance; and from 0% to about 40% by weight of a softening or tenderizing agent, the weight ratio of apple particles to binder/texturizer solution being from about 20:1 to about 7:1, wherein the crystallizable sugar is sucrose, the moisture-absorbing substance is a cold-swellable, pregelled starch and the softening agent is an unsaturated or partially hydrogenated oil.

22. A crunchy fruit brittle in the form of a sheeted composite having a thickness from about 0.04 inches to about 0.16 inches and a moisture content from about 0% to about 3%, said composite comprising:
 (a) apple particles, at least 35% of which have a particle size from about 0.03 inches to about 0.14 inches, wherein at least 40% of the apple cells of said particles are intact; and
 (b) a binder/texturizer composition comprising from about 5% to about 100% by weight of a crystallizable sugar; from about 0% to about 55% by weight of a moisture-absorbing substance; and from 0% to about 40% by weight of a softening or tenderizing agent,
the weight ratio of apple particles to binder/texturizer solution being from about 20:1 to about 7:1, wherein the moisture-absorbing substance is cracker flour.

23. A crunchy fruit brittle in the form of a sheeted composite having a thickness from about 0.04 inches to about 0.16 inches and a moisture content from about 0% to about 3%, said composite comprising:
 (a) apple particles, at least 35% of which have a particle size from about 0.03 inches to about 0.14 inches, wherein at least 40% of the apple cells of said particles are intact; and
 (b) a binder/texturizer composition comprising from about 5% to about 100% by weight of a crystallizable sugar; from about 0% to about 55% by weight of a moisture-absorbing substance; and from 0% to about 40% by weight of a softening or tenderizing agent,
the weight ratio of apple particles to binder/texturizer solution being from about 20:1 to about 7:1, wherein the binder/texturizer contains from about 1% to about 10% by weight pectin.

24. A crunchy fruit brittle in the form of a sheeted composite having a thickness from about 0.04 inches to about 0.16 inches and a moisture content from about 0% to about 3%, said composite comprising:
 (a) apple particles, at least 35% of which have a particle size from about 0.03 inches to about 0.14 inches, wherein at least 40% of the apple cells of said particles are intact; and
 (b) a binder/texturizer composition comprising from about 5% to about 100% by weight of a crystallizable sugar; from about 0% to about 55% by weight of a moisture-absorbing substance; and from 0% to about 40% by weight of a softening or tenderizing agent,
the weight ratio of apple particles to binder/texturizer solution being from about 20:1 to about 7:1, wherein the crystallizable sugar is a mixture of sucrose and crystalline fructose.

25. A crunchy fruit brittle as claimed in claim 20 wherein the binder/texturizer contains up to about 4% of a food grade acid.

26. A crunchy fruit brittle as claimed in claim 24, wherein the binder/texturizer contains up to about 3% citric acid.

* * * * *